(12) United States Patent
Tableau et al.

(10) Patent No.: US 11,814,990 B2
(45) Date of Patent: Nov. 14, 2023

(54) TURBOMACHINE TURBINE HAVING A CMC NOZZLE WITH LOAD SPREADING

(71) Applicant: SAFRAN AIRCRAFT ENGINES, Paris (FR)

(72) Inventors: Nicolas Paul Tableau, Moissy-Cramayel (FR); Sébastien Serge Francis Congratel, Moissy-Cramayel (FR); Antoine Claude Michel Etienne Danis, Moissy-Cramayel (FR); Matthieu Arnaud Gimat, Moissy-Cramayel (FR); Gilles Gérard Claude Lepretre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1 day.

(21) Appl. No.: 17/755,288

(22) PCT Filed: Oct. 28, 2020

(86) PCT No.: PCT/FR2020/051944
§ 371 (c)(1),
(2) Date: Apr. 26, 2022

(87) PCT Pub. No.: WO2021/084203
PCT Pub. Date: May 6, 2021

(65) Prior Publication Data
US 2022/0364475 A1    Nov. 17, 2022

(30) Foreign Application Priority Data
Oct. 31, 2019  (FR) ..................... 1912249

(51) Int. Cl.
*F01D 9/04*  (2006.01)
*F01D 5/28*  (2006.01)

(52) U.S. Cl.
CPC ............. *F01D 9/041* (2013.01); *F01D 5/282* (2013.01); *F01D 9/042* (2013.01);
(Continued)

(58) Field of Classification Search
CPC ..... F01D 9/00; F01D 9/02; F01D 9/04; F01D 9/041; F01D 9/042; F01D 5/282;
(Continued)

(56) References Cited

U.S. PATENT DOCUMENTS

| 5,074,752 A | 12/1991 | Murphy et al. |
| 2005/0169759 A1* | 8/2005 | Haubert ................. F01D 5/147 |
| | | 416/193 R |

(Continued)

FOREIGN PATENT DOCUMENTS

| EP | 2443318 B1 | 12/2014 |
| EP | 3244016 A2 | 11/2017 |

(Continued)

OTHER PUBLICATIONS

French Search Report issued in French Application No. FR1912249 dated May 14, 2020 (2 pages).
International Search Report issued in International Application No. PCT/FR2020/051944, dated Feb. 25, 2021 with English Translation (14 pages).

*Primary Examiner* — Elton K Wong
(74) *Attorney, Agent, or Firm* — Bookoff McAndrews, PLLC (57) ABSTRACT

A turbine comprises a casing, an outer metal shroud, an inner metal shroud and an annular distributor having a plurality of CMC ring sectors, each sector comprising a mast, an inner platform, an outer platform and at least one blade having a hollow profile that defines an inner housing, the inner and outer platforms each having an opening communicating with said inner housing, and the mast passing through said openings and the inner housing and being secured to said casing and connected to said annular sector. Each blade (Continued)

comprises at least one first radial shoulder projecting axially towards the inside of the blade, and each mast comprises at least one second shoulder projecting axially towards the outside of the mast configured to radially cooperate with a first shoulder and radially press the blade against the mast.

10 Claims, 5 Drawing Sheets

(52) U.S. Cl.
CPC .. *F05D 2220/323* (2013.01); *F05D 2240/128* (2013.01); *F05D 2250/291* (2013.01); *F05D 2250/38* (2013.01); *F05D 2260/31* (2013.01); *F05D 2260/36* (2013.01); *F05D 2300/6033* (2013.01)

(58) Field of Classification Search
CPC ............. F01D 5/284; F05D 2300/6033; F05D 2240/128; F05D 2250/291; F05D 2250/38; F05D 2260/31; F05D 2260/35
See application file for complete search history.

(56) References Cited

U.S. PATENT DOCUMENTS

| | | |
|---|---|---|
| 2011/0311353 A1 | 12/2011 | Arness et al. |
| 2020/0080434 A1* | 3/2020 | Thomas .................. F01D 5/282 |
| 2020/0200023 A1* | 6/2020 | Whittle .................. F01D 9/042 |
| 2020/0248568 A1* | 8/2020 | Whittle .................. F01D 5/189 |

FOREIGN PATENT DOCUMENTS

| | | |
|---|---|---|
| FR | 2973435 A1 | 10/2012 |
| FR | 2979662 A1 | 3/2013 |
| FR | 3061928 A1 | 7/2018 |
| FR | 3080146 A1 | 10/2019 |
| WO | 2010061140 A1 | 6/2010 |
| WO | 2010116066 A1 | 10/2010 |
| WO | 2010146288 A1 | 12/2010 |
| WO | 2011080443 A1 | 7/2011 |

* cited by examiner

TURBOMACHINE TURBINE HAVING A CMC NOZZLE WITH LOAD SPREADING

CROSS-REFERENCE TO RELATED APPLICATION(S)

This application is a National Stage Application of International Application No. PCT/FR2020/051944, filed on Oct. 28, 2020, which claims priority to French Patent Application No. FR 1912249, filed on Oct. 31, 2019, which is incorporated by reference herein in its entirety.

TECHNICAL FIELD

The invention relates to turbomachines, in particular aeronautical turbine engines or industrial turbines, and more particularly a turbine distributor made of composite material with a ceramic matrix or with an at least partially ceramic matrix, hereinafter referred to as CMC material.

PRIOR ART

The field of application of the invention is in particular that of aeronautical gas turbine engines. The invention is however applicable to other turbomachines, for example industrial turbines.

Improving the performance of turbomachines and reducing their polluting emissions leads to considering increasingly high operating temperatures.

For elements of hot portions of turbomachines, it has therefore been proposed to use ceramic matrix composite materials denoted CMC hereafter.

CMC materials are typically formed of a fibrous reinforcement made of refractory fibers, such as carbon or ceramic fibers, densified by a ceramic or at least partially ceramic matrix.

These materials have remarkable thermo-structural properties, that is to say mechanical strength properties which make them capable of constituting structural elements and the ability to maintain these mechanical strength properties at high temperatures. In addition, CMC materials have a much lower density than that of the metal materials conventionally used for elements of hot portions of turbomachines.

Thus, documents WO 2010/061140, WO 2010/116066 and WO 2011/080443 describe the production of impeller vanes of CMC turbomachines with integrated platform and root. The use of CMC materials for turbine distributors has also been proposed, in particular in documents WO 2010/146288, FR 2 979 662 and EP 2 443 318.

A conventional metal turbine distributor has a crown shape composed of several assembled sectors, each sector comprising an inner platform, an outer platform and a plurality of blades extending between the inner and outer platforms and integral therewith. The inner platforms juxtaposed circumferentially end-to-end form an inner shroud and the outer platforms juxtaposed circumferentially end-to-end form an outer shroud. The inner and outer shrouds delimit the gas flow path in the distributor stage.

Introducing a distributor, for example a high-pressure distributor, made of CMC allows to increase the maximum tolerated temperature compared to a metal distributor, and thus to reduce the amount of cooling air used. Thus, this allows to increase the performance of the turbomachine.

However, CMC, due to its properties different from metal, is more sensitive to certain mechanical stresses. Indeed, the CMC has greater rigidity and less expansion. It behaves better in compression, but its allowable tensile stresses are lower than those of metal.

In addition, the integration in a metal environment of a CMC part is delicate because of the differential thermal expansions between the CMC and the metal. This is all the more delicate in a turbomachine, and more particularly in a high-pressure portion of the turbomachine, because the environment is very hot, which exacerbates the differences in coefficients of thermal expansion between the materials, the aerodynamic loads undergone by a high-pressure distributor furthermore being high in this turbine area.

CMC distributors are known, such as, for example, a turbine distributor including an outer support shroud integral with a casing, an inner support shroud, and a plurality of CMC ring sectors forming a crown extending between the outer support shroud and the inner support shroud. Each ring sector bears on the inner and outer support shrouds and includes an inner platform, an outer platform, and at least one blade extending between the outer platform and the inner platform and integral therewith.

However, there is a need to improve the known solutions with regard to the deterministic securing of the CMC ring sector to the inner shroud, in particular in terms of at least axial retention of the ring sector and in terms of spreading the aerodynamic loads.

Moreover, a significant pressure differential is exerted on the casing under the distributor in the radial direction. This casing is used to create a sealing between the rotor and the stator. This pressure difference is the source of a load which, if it were exerted on the CMC, would be too high given the allowable materials.

The distributor as described above and further including a reinforcing mast extending radially inside the vanes between the two platforms allowing the distributor to be held to the casing by the mast, is also known, in particular from documents FR 3 061 928 and FR 2 973 435.

However, such a solution spreads both, via the mast, the loads relating to the pressure differential under the distributor and the aerodynamic loads on the CMC crown. Furthermore, for the reasons mentioned above relating to the different mechanical behavior between CMC and metal material, it is difficult to position the CMC portion on the metal environment by clamping it.

It is known to ensure the tangential and axial positioning of the CMC blade via axial and tangential tabs for positioning on the mast allowing the CMC blade to be pressed against the metal mast in operation thanks to the axial and tangential aerodynamic loads.

However, during operation of the turbine, a large radial clearance is generated between the metal portions such as the mast, and the inner and outer support shrouds and the blade traversed by the mast, although when cold this clearance is zero. More particularly, in operation, due to the lower coefficient of expansion on the CMC blade compared to the metal material of the mast and the shrouds, a radial clearance is created at the interface between the CMC blade and the inner and outer support shrouds.

There are two issues with the opening of these clearances in operation. First, additional leaks are created, reducing the performance of the turbomachine. And, second, if radial clearances are created on both the upper and lower portions of the distributor, the radial positioning of the blade is no longer ensured. In the absence of this deterministic radial positioning, several harmful consequences can occur such as untimely radial movements of the blade (vibrations) and/or the creation of a step, that is to say a landing, in the flow path.

There is therefore a need to improve the deterministic retention of the CMC distributor of this solution.

DISCLOSURE OF THE INVENTION

The invention aims at addressing the disadvantages mentioned above and overcoming the difficulties mentioned above by proposing a turbomachine turbine comprising a turbine distributor at least partly made of CMC, the mounting of which is simplified and adapted to hold its ring sectors in a deterministic way while allowing the sectors to deform independently of the metal parts at the interface, and guaranteeing satisfactory sealing.

More particularly, the invention aims at limiting, or even eliminating, the radial clearance opening in operation between the mast and the CMC blade, and thus to control the radial positioning of the CMC blade, using the axial and tangential aerodynamic loads in the flow path.

An object of the invention proposes a turbomachine turbine comprising a casing, an outer metal support shroud integral with the casing, an inner metal support shroud, and an annular turbine distributor defining an axial direction and a radial direction and including a plurality of distributor sectors made of ceramic matrix composite material forming a crown extending between the outer support shroud and the inner support shroud.

Furthermore, each sector includes a metal mast, an inner platform, an outer platform and at least one blade extending radially between the inner and outer platforms and having a hollow profile that defines an inner housing extending radially, the inner and outer platforms each having an opening communicating with said inner housing of the blade, and the mast passing through said openings and the inner housing and being secured to said casing on the one hand and connected to said annular sector on the other hand.

According to a general feature of the invention, each blade comprises at least one first radial shoulder projecting in the axial direction from an inner surface of the blade towards the inside of the blade, and each mast comprises at least one second shoulder projecting in the axial direction from an outer surface of the mast towards the outside of the mast configured to cooperate with a first shoulder in the radial direction and radially press the blade against the mast.

The invention thus allows to limit or even eliminate the radial clearance opening in operation between the metal mast and the CMC blade and thus to reduce or even remove uncertainty with regard to the position of the blade.

The shoulders provided both on the inside of the hollow blade and on the outside of the mast allow to overcome the lack of determinism in the positioning of the blade, the shoulders allowing the blade to be pressed radially inwards or outwards using the aerodynamic loads in the flow path.

In normal operation, the resultant of the aerodynamic loads on the CMC blade allows the CMC fairing to be pressed against one of the inner or outer shrouds, and thus to be positioned radially. The invention allows to add deterministic radial positioning solutions, and thus to control the position of the CMC vane in all types of engine operation.

According to a first aspect of the turbine, at least one first shoulder comprises a first beveled portion forming a first non-zero angle with the axial direction and at least one second shoulder comprises a second beveled portion forming a second non-zero angle with the axial direction, the first and the second angles being of the same measure.

The beveled tabs provide a deterministic retention in the radial position of the CMC blade on the metal mast. These bevels attached to the metal mast allow to use the aerodynamic axial loads to deterministically press the CMC blade towards the top of the flow path at the radial stop of the outer support shroud 360°, by filling the radial clearance created by the differential expansion between the CMC and the hot metal parts.

According to a second aspect of the turbine, the first and the second angles are each comprised between 10° and 80° to allow effective pressing.

A low angle allows better positioning of the CMC distributor radially at the limit of radial locking.

Below a value of 10° for the first and second angles, the differential expansions between the metal mast and the CMC distributor can become problematic in terms of hot radial stresses.

Beyond 80° for the first and second angles, the slight inclined slopes can allow potential radial sliding of the CMC distributor with respect to the metal mast.

According to a third aspect of the turbine, said at least one second shoulder is disposed in the radial direction between the first shoulder with which it cooperates to achieve radial pressing and the outer support shroud to press the blade against the inner support shroud.

According to a fourth aspect of the turbine, said at least one second shoulder is disposed in the radial direction between the first shoulder with which it cooperates to achieve the radial pressing and the inner support shroud to press the blade against the outer support shroud.

According to a fifth aspect of the turbine, the turbine may comprise a first shoulder and a third shoulder on the blade including respectively a first and a third beveled portions respectively forming a first angle and a third angle with the axial direction, as well as a second shoulder and a fourth shoulder on the mast including respectively a second and a fourth beveled portions respectively forming a second angle and a fourth angle with the axial direction, the first and the second angles being of the same measure and the third and the fourth angles being of the same measure and different from the first and second angles.

This configuration allows to h the radial position of the blade in operation with respect to the mast.

According to a sixth aspect of the turbine, the first and second shoulders and/or the third and fourth shoulders are intended to cooperate by shape complementarity. For this purpose, the angle of the first and second angles and/or the angle of the third and fourth angles are equal in absolute value and of opposite sign.

According to a seventh aspect of the turbine, the first shoulder is present in the vicinity of the outer radial end of the blade in the radial direction while the third shoulder is present in the vicinity of the inner radial end of the blade in the radial direction.

According to an eighth aspect of the turbine, the mast can be hollow. The mast thus allows to bring air into the cavity radially outside the outer shroud in order to pressurize it and thus prevent the air circulating in the flow path extending between the inner and outer platforms of the ring sectors from being reintroduced outside this flow path and thus from reducing the performance and from increasing the risk of overheating the parts.

According to a ninth aspect of the turbine, the mast can comprise at least one portion projecting in the axial direction connected to the blade to hold the blade in position.

In another embodiment of the turbine, the outer metal shroud may comprise an opening for each mast, and, for each sector, the mast may pass through said openings of the inner and outer platforms, said inner housing, and one of the openings of the outer metal shroud, and comprise at least one attachment projection having at least one portion extending from a radially outer end in a direction opposite to the center of the mast and in, or tangentially to, a plane orthogonal to the radial direction, said at least one attachment projection cooperating with a radially outer face of the outer support shroud. This improved sealing connection also allows to remove many interface areas.

Furthermore, the outer support shroud can be made integrally, that is to say be non-sectored. This allows to mount the mast radially from the outside of the outer support shroud and to limit as much as possible the leaks which would be present in the case of a sectored shroud.

Said at least one attachment projection of the mast of each blade can also extend in a plane, and the radially outer face of the outer support shroud can comprise a facet for receiving an attachment projection for each blade, each facet being flat, that is to say extending in a plane defined by only two non-circular directions. The facets made for each of the blades allow to have a plane/plane contact between the mast and the shroud, thus improving the sealing between the two elements facilitating the positioning of the mast. The shroud is machined so as to have as many "facets" as blades and therefore as masts.

The outer support shroud may comprise an upstream end and a downstream end in the axial direction, and a shoulder extending in the radial direction from one of the upstream or downstream ends of the outer shroud over the entire circumference of the outer support shroud, and the mast of each blade may comprise a projection of anti-rotation of the mast relative to the blade extending in the axial direction from the radially outer end of the mast and forming a bearing extending in a circumferential direction of the outer support shroud bearing in the axial direction against the shoulder of the outer support shroud. The bearing of the mast on the shoulder of the outer support shroud allows to hold the mast and thus the blade from any rotation around a radial axis.

The outer support shroud may further comprise, for each blade, a centering pin extending radially from said radially outer face, and the mast of each blade may comprise a centering opening configured to cooperate with a centering pin. The centering pin on the outer support shroud and the centering opening provided on the mast, for example on a centering projection extending from the outer radial end of the mast or directly on one or the attachment projection, provides a first point of anti-rotation.

Preferably, the centering pin is provided on a downstream portion of the outer support shroud with respect to the direction of the gas stream intended to pass through the flow path defined by the annular CMC distributor.

Alternatively, the outer support shroud may comprise an upstream end and a downstream end in the axial direction, and screws associated with means for holding in the radial position and threaded openings holding a portion of the mast on the outer support shroud, and preferably on an upstream portion of the outer shroud or both on an upstream portion and a downstream portion of the outer shroud.

The mast may also comprise at least one portion projecting in the axial direction connected to the blade to hold the blade in position.

Preferably, for each sector, the screws and the threaded opening are disposed downstream of the mast reception opening and the centering pin is disposed upstream of the mast reception opening. The threaded openings are preferably made in lugs provided in the attachment projection.

The invention also relates to a turbomachine comprising a turbomachine turbine as defined above.

The invention also relates to an aircraft comprising at least one turbomachine as defined above.

Figure 1:
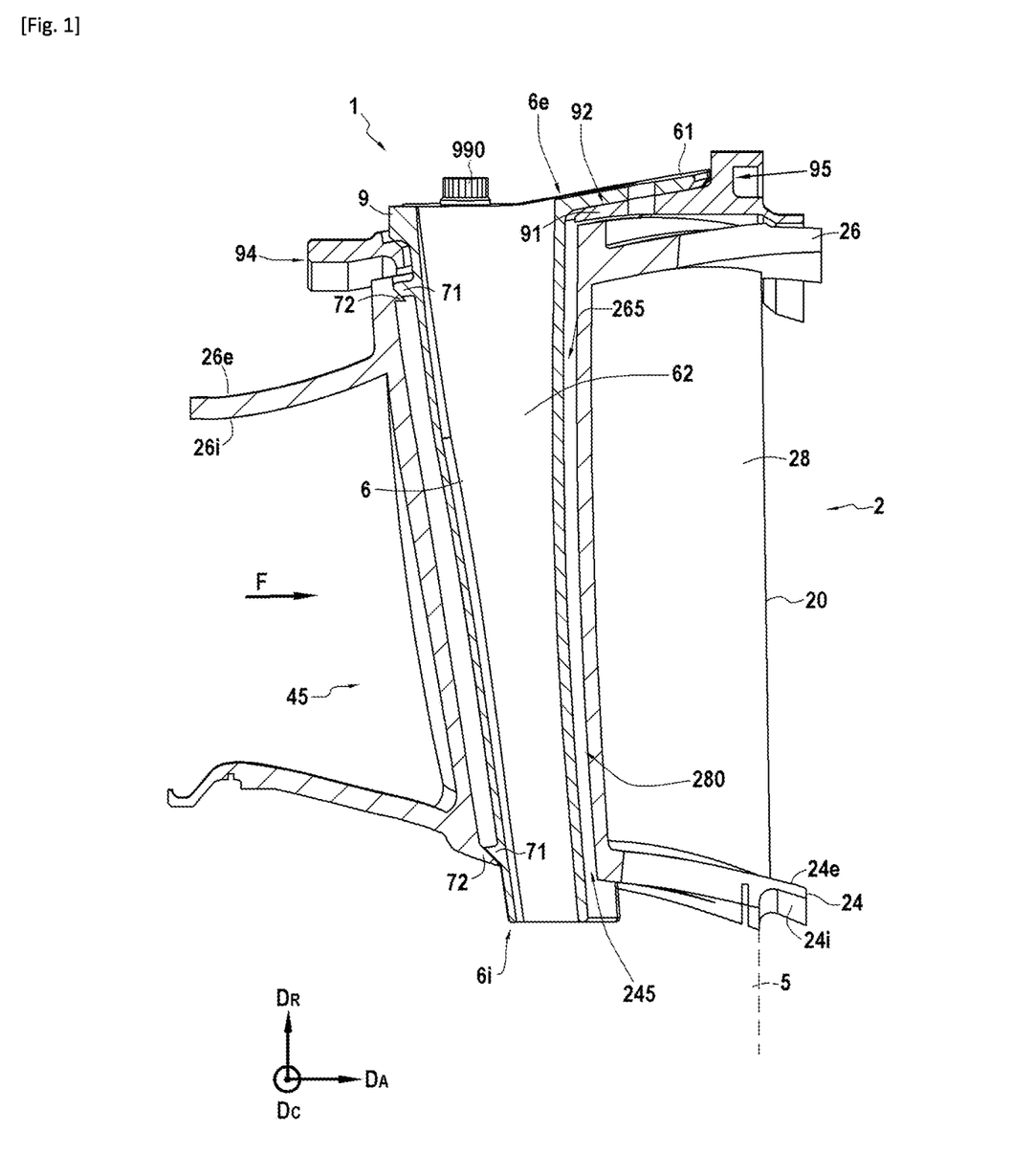
FIG. 1 is a schematic sectional view of a sector of a turbine according to a first embodiment of the invention.

DESCRIPTION OF THE EMBODIMENTS zo FIG. 1 shows a schematic sectional view of a sector of a turbine according to one embodiment of the invention.

A high-pressure turbine 1 of a turbomachine, for example an aeronautical turbine engine, as partially shown in FIG. 1, comprises a plurality of fixed distributors 2 which alternate with impellers in the flow direction of the gas stream F, indicated by an arrow in FIG. 1, in the turbine 1 and which are mounted in a casing 4 of the turbine (illustrated in FIGS. 5 to 8).

Each impeller comprises a plurality of vanes having an inner shroud, and at least one blade extending from and connected to the inner shroud. On the inner side of the inner shroud, the vane is extended by a foot engaged in a housing of a disc. On the outer side, the tip of the vanes faces an abradable material carried by a ring to seal the tips of the vanes.

Throughout the present text, the terms "inner" or "internal" and "outer" or "external" are used with reference to the position or the orientation with respect to the axis of rotation of the turbine 1 which defines the axial direction $D_A$ of the turbine 1.

The vanes of the impeller can be conventional metal vanes or vanes made of CMC material obtained for example as described in the documents WO 2010/061140, WO 2010/116066, WO 2011/080443.

At least one of the distributors 2 of the turbine 1 is formed by joining together several sectors of annular distributors 20 made of CMC material to form a complete ring. The arrow $D_A$ indicates the axial direction of the distributor 2 while the arrow $D_R$ indicates the radial direction of the distributor 2 and the mark $D_C$ indicates the circumferential direction.

Each distributor sector 20 of the distributor 2 comprises an inner platform 24, an outer platform 26 and a blade 28 extending between the inner and outer platforms 24 and 26 and integral therewith. Alternatively, several blades could extend between the inner and outer platforms of the same distributor sector. Once assembled with the casing 4 of the turbine 1, the sectors 20 form a single crown of distributors 2 having an inner shroud formed by the juxtaposition of the inner platforms 24 of the sectors 20 and an outer shroud formed by the juxtaposition of the outer platforms 26 of the sectors 20.

The inner shroud formed by the inner platforms 24 and the outer shroud formed by the outer platforms 26 form therebetween a fluid flow path 45 inside which the gas stream F flows during operation of the turbine 1.

Throughout the text, the terms "upstream" and "downstream" are used with reference to the flow direction of the gas stream F in the flow path 45 indicated by an arrow. The inner platforms 24 each have an outer surface 24e intended to be in contact with the gas stream F, and therefore disposed radially opposite the outer platforms 26 forming the outer shroud. The inner platforms 24 also have an inner surface 24i disposed facing the axis of rotation of the turbine 1.

The outer platforms 26 each have an outer surface 26e disposed facing the casing 4 and formed by the surface of the second portion of the outer platforms 26 oriented radially outwards. The outer platforms 26 also have an inner surface 26i intended to be in contact with the gas stream F, and therefore disposed radially facing the inner platforms 24 forming the inner shroud and facing the axis of rotation of the turbine 1.

The distributor 2 is held between an inner metal shroud 5 and an outer metal shroud 9 between which extends the crown formed by the assembly of the ring sectors 20 of the distributor 2. The outer metal shroud 9 is integral with the casing 4 and has an inner surface 91 and an outer surface 92 in the radial direction $D_R$.

As illustrated in FIG. 1, each blade 28 has a hollow profile having an inner housing 280 extending over the entire height of the blade 28, that is to say between the inner platform 24 and the outer platform 26 of the ring sector 20. The inner platform 24 of each distributor sector 20 comprises an opening 245 whose shape corresponds to the section of the inner housing 280 in the plane in which the inner platform 24 extends. Similarly, the outer platform 26 of each distributor sector 20 comprises an opening 265 whose shape corresponds to the section of the inner housing 280 in the plane in which the inner platform 26 extends. The openings 245 and 265 of the inner 24 and outer 26 platforms are made in the extension of the inner housing 280 of the blade 28.

The inner housing 280 of the blade 28 and the openings 245 and 265 of the inner 24 and outer 26 platforms can be connected to a cooling system delivering a cooling air stream from the casing 4 to the blade 28 and the inner 24 and outer 26 platforms.

Figure 2:
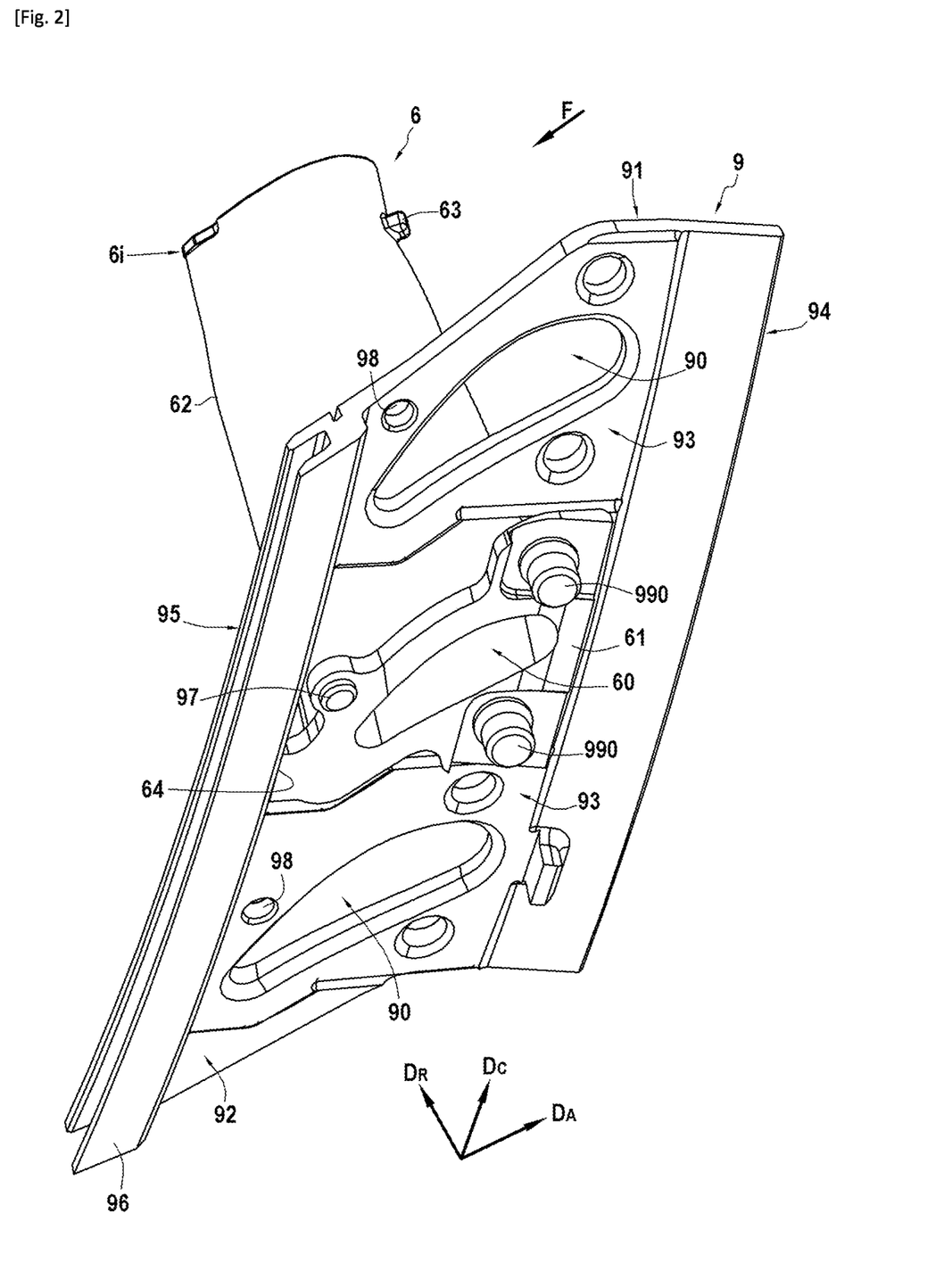
FIG. 2 is a schematic assembled view of an outer support shroud and a mast of the turbine of FIG. 1.
Figure 3:
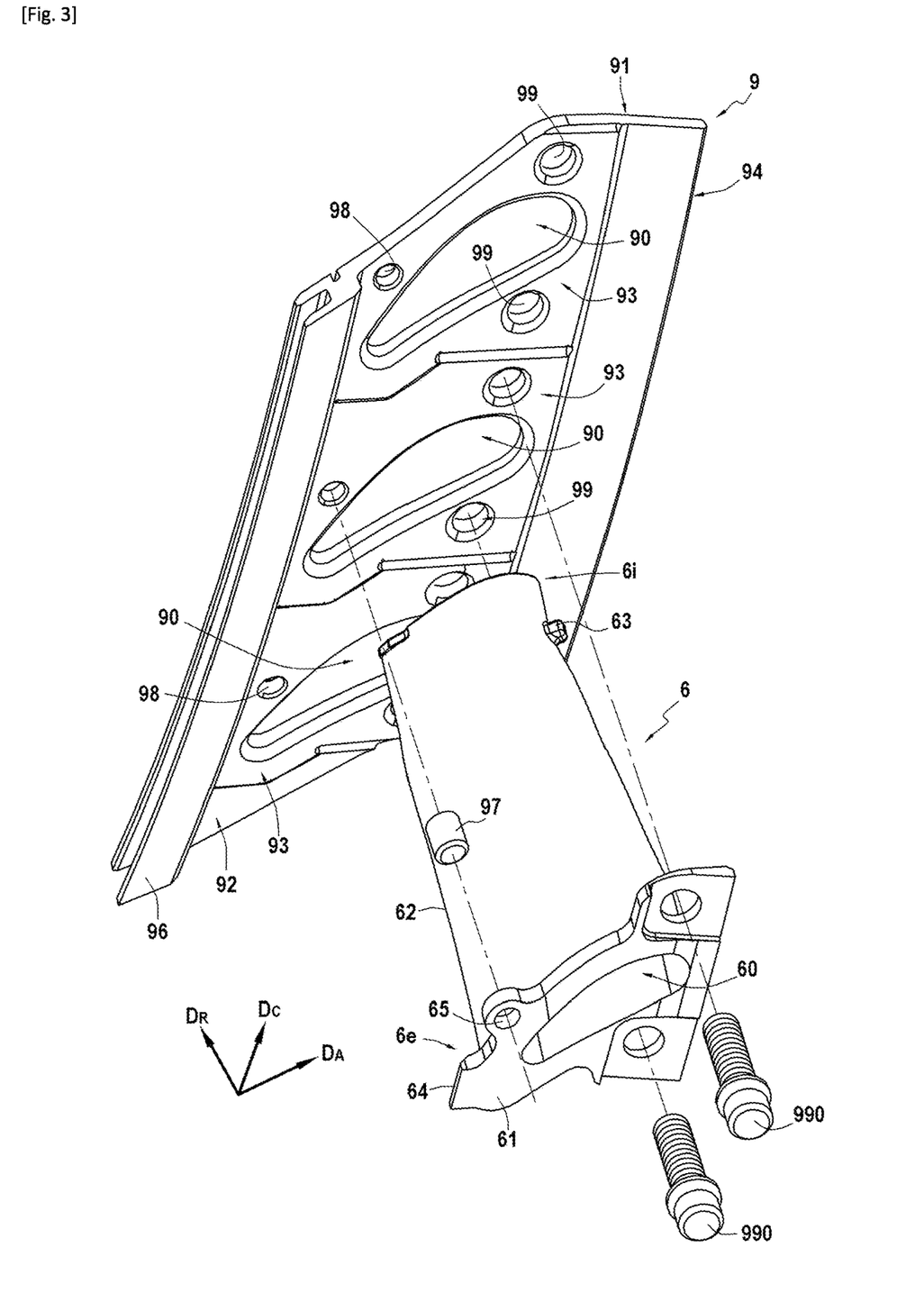
FIG. 3 shows an exploded schematic view of an outer support shroud and a mast of the turbine of FIG. 1.

As illustrated in FIG. 1 and in FIGS. 2 and 3 which show two schematic views of an outer support shroud 9 and a mast 6 of the turbine 1 of FIG. 1, the turbine 1 further comprises, for each distributor sector 20, a mast 6 extending in the radial direction $D_R$. In FIG. 2, the outer metal shroud 9 and the mast 6 are assembled, and in FIG. 3, the outer metal shroud 9 and the mast 6 are exploded.

As illustrated in FIGS. 1 to 3, the mast 6 comprises a mast head 61 bearing on the outer surface 92 of the outer metal shroud 9, and a body 62 projecting from the head 61 in the radial direction $D_R$ inwards and configured to pass through the outer metal shroud 9, and the openings 245 and 265 of the inner 24 and outer 26 platforms being aligned with the inner housing 280 of the blade 28.

In other words, the mast 6 comprises a first radially inner end 6i and a second radially outer end 6e, a body 62 extending substantially in the radial direction $D_R$ between the first and second ends 6i and 6e of the mast 6, and a mast head 61 projecting in a plane orthogonal to the radial direction $D_R$ from the second end 6e of the mast 6. The mast head 61 forms a flat support extending in a plane orthogonal to the radial direction $D_R$.

The mast 6 is hollow to bring air into the cavity radially inside the inner shroud in order to pressurize it and thus prevent the air circulating in the flow path extending between the inner and outer platforms of the distributor sectors from being reintroduced outside this flow path and thus from reducing the performance and from increasing the risk of overheating the parts. The mast 6 thus comprises an inner housing 60 extending in the radial direction $D_R$ between the first and second ends 6i and 6e of the mast 6.

The outer metal shroud 9 comprises openings 90 for receiving the mast 6 shaped to be traversed by a mast 6, and flat facets 93 to each bearingly receive a mast head 61.

The outer metal shroud 9 comprises an upstream end 94 and a downstream end 95 in the axial direction $D_A$. On its downstream end 95, the outer metal shroud 9 comprises a shoulder 96 extending in the radial direction $D_R$ over the entire circumference of the outer metal shroud 9. The outer metal shroud 9 further comprises, for each blade 28, and therefore for each mast 6, a centering pin 97 fitting into an opening 98 provided in the outer metal shroud 9. When the centering pin 97 is fitted into the opening 98, the pin 97 projects in the radial direction $D_R$ from the radially outer face 92 of the outer metal shroud 9. The centering pins 97 are disposed, in this embodiment, on a downstream portion of the outer metal shroud 9, that is to say close to the downstream end 95 of the outer metal shroud 9, between the shoulder 96 and the upstream end 94.

The downstream end 95 of the outer metal shroud 9 forms a hook open downstream for securing the outer metal shroud 9 to the casing.

The mast head 61 comprises an anti-rotation bearing 64 extending in the circumferential direction $D_c$ bearing in the axial direction $D_A$ against the shoulder 96 of the outer metal shroud 9 to hold the mast 6 and thus the blade 28 with which the mast 6 cooperates from any rotation about a radial axis. Each mast 6 further comprises a centering opening 65 shaped to cooperate with one of the centering pins 97 of the outer metal shroud 9.

In the illustrated embodiment, the outer metal shroud 9 further comprises, for each mast 6, threaded openings 99 on an upstream portion and each mast 6 comprises upstream securing openings 66 configured to overlap the threaded openings 99 of the outer metal shroud 9 when the mast 6 is mounted on the outer metal shroud 9. The outer metal shroud 9 comprises screws 990 each passing through an upstream opening 66 for securing the mast 6 and a threaded opening for securing the mast 6 to the outer metal shroud 9. The screws 990 are associated with means for holding in the radial position to hold a portion of the mast 6 on an upstream portion of the outer metal shroud 9.

In the case where each distributor sector comprises several blades, the turbine would comprise, at most, a corresponding number of masts for each distributor sector.

In a variant, the mast head 61 may comprise a plurality of projections extending from the second end 6e of the mast 6, some of them comprising at least one of the elements for holding or centering the mast 6.

Figure 4:
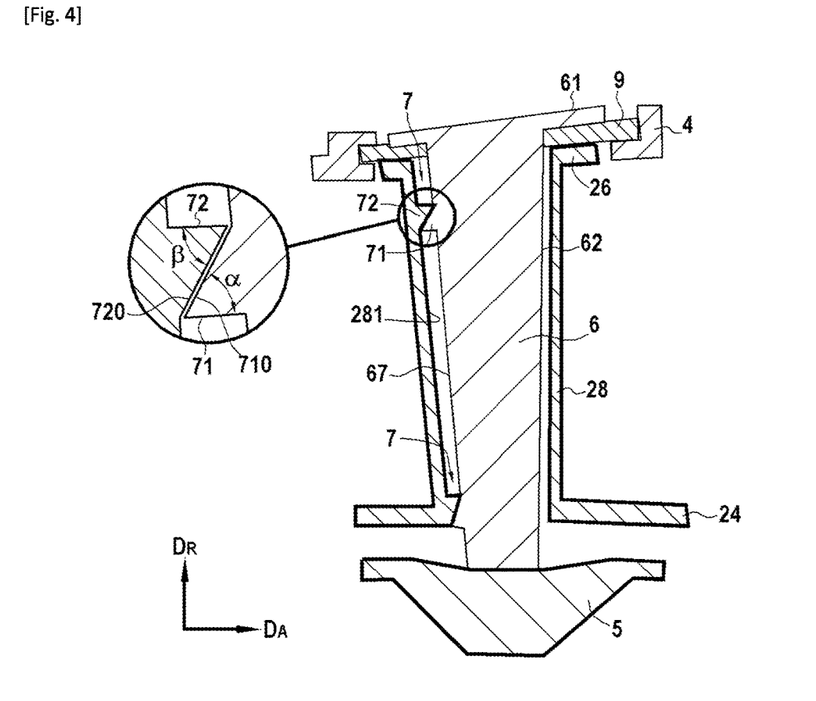
FIG. 4 shows a schematic sectional view along a plane comprising the axial direction and the radial direction of a turbine sector of FIG. 1.

As illustrated in FIG. 1 and in FIG. 4 which schematically shows a sectional view of FIG. 1 along a sectional plane comprising the axial direction $D_A$ and the radial direction $D_R$, to hold the blade 28 radially in position, the turbine 1 comprises a first and a second radial holding means 7, the first radial holding means being radially disposed between the second radial holding means and the outer support shroud 9.

Each radial holding means 7 comprises, in the first embodiment, a shoulder 71 and a complementary shoulder 72 cooperating with the shoulder 71 with which it is associated for the radial holding of the blade 28. Each shoulder 71 projects from an outer surface 67 of the mast 6 towards the outside of the mast 6, that is to say towards the blade 28. Each complementary shoulder 72 projects from an inner surface 281 of the blade 28 towards the inside of the blade 28, that is to say towards the mast 6.

Each shoulder 71 on the mast 6 comprises a beveled portion 710 forming an angle α with the axial direction $D_A$ comprised between 20° and 70, and here approximately 45°. Similarly, each additional shoulder 72 on the blade 28 comprises a beveled portion 720 forming an angle β with the axial direction $D_A$ having the same value as the angle α, that is to say comprised between 20° and 70, and here about 45°. The beveled portion 710 of the shoulder 71 and the beveled portion 720 of the complementary shoulder 72 of the same radial holding means 7 are disposed facing each other, and even in contact along the same plane of contact extending over the entire surface of the beveled portion.

In the first embodiment illustrated in FIGS. 1 and 4, the turbine 1 thus comprises a first radial holding means 7 comprising a first shoulder 71 and a first complementary shoulder 72 and a second radial holding means 7 comprising a second shoulder and a second complementary shoulder.

In the first embodiment, the first complementary shoulder 72 is radially disposed between the first shoulder 71 and the outer support shroud 9, and the second complementary shoulder 72 is radially disposed between the second shoulder 71 and the first complementary shoulder, that is to say between the second shoulder 71 and the outer support shroud 9.

In this embodiment, the aerodynamic loads drive the vane 28 which is radially pressed against the outer support shroud 9 via the two radial holding means 7.

Figure 5:
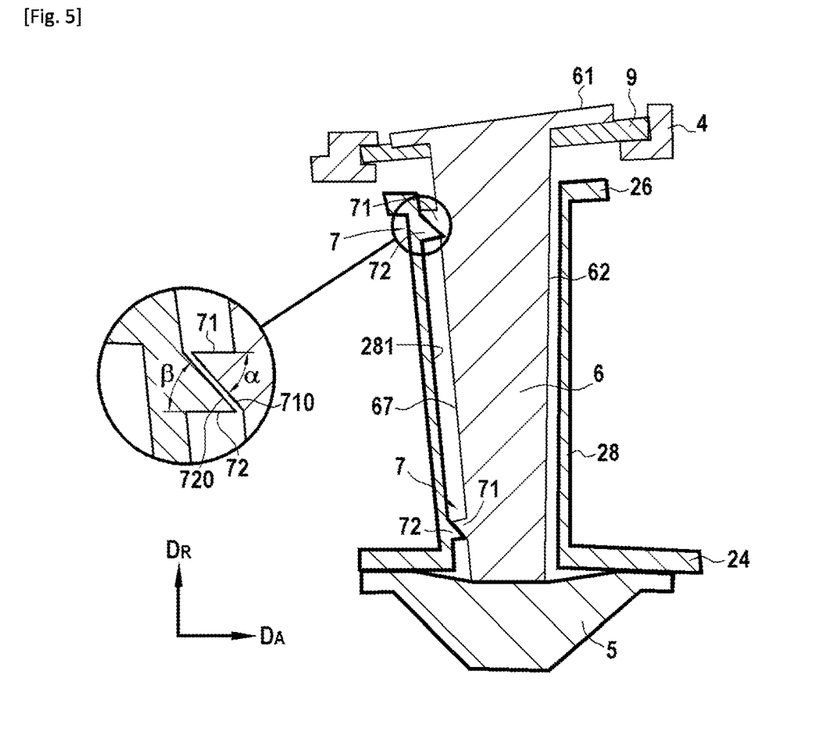
FIG. 5 shows a schematic sectional view along a plane comprising the axial direction and the radial direction of a turbine sector according to a second embodiment of the invention.

FIG. 5 schematically shows a sectional view along a plane comprising the axial direction $D_A$ and the radial direction $D_R$ of a turbine sector according to a second embodiment of the invention.

The second embodiment of the invention illustrated in FIG. 5 differs from the first embodiment illustrated in FIG. 4 in that the first complementary shoulder 72 is radially disposed between the first shoulder 71 and the inner support shroud 5, and the second complementary shoulder 72 is radially disposed between the second shoulder 71 and the inner support shroud 5. In this embodiment, the aerodynamic loads drive the vane 28 which is radially pressed against the inner support shroud 5 via the two radial holding means 7.

Figure 6:
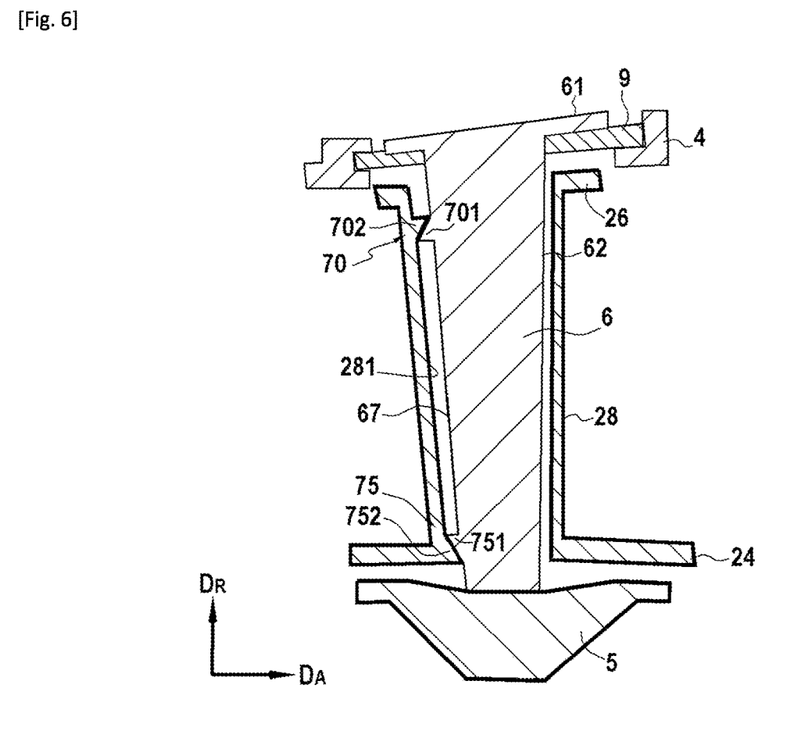
FIG. 6 shows a schematic sectional view along a plane comprising the axial direction and the radial direction of a turbine sector according to a third embodiment of the invention.

FIG. 6 schematically shows a sectional view along a plane comprising the axial direction $D_A$ and the radial direction $D_R$ of a turbine sector according to a third embodiment of the invention.

The third embodiment of the invention illustrated in FIG. 6 differs from the first embodiment illustrated in FIG. 4 in that the turbine 1 comprises a first radial holding means 70 including a first shoulder 701 and a first complementary shoulder 702 radially disposed between the first shoulder 701 and the outer support shroud 9, and a second radial holding means 75 including a second shoulder 751 and a second complementary shoulder 752 radially disposed between the second shoulder 751 and the inner support shroud 5, the first radial holding means 70 being radially disposed between the second radial holding means 75 and the outer support shroud 9. The first shoulder 702 is present in the vicinity of the outer radial end of the blade 28 in the radial direction $D_R$ while the third shoulder 752 is present in the vicinity of the inner radial end of the blade in the radial direction $D_R$.

In this embodiment, the aerodynamic loads drive the vane 28 which is radially pressed against the mast 6 and held in a radial position with respect to the mast 6.

Figure 7:
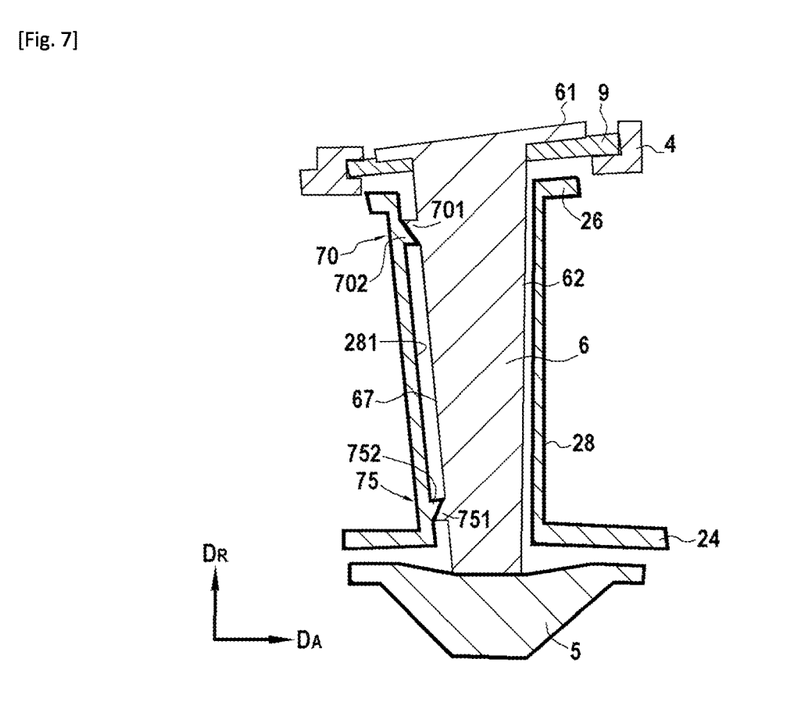
FIG. 7 shows a schematic sectional view along a plane comprising the axial direction and the radial direction of a turbine sector according to a fourth embodiment of the invention.

FIG. 7 schematically shows a sectional view along a plane comprising the axial direction $D_A$ and the radial direction $D_R$ of a turbine sector according to a fourth embodiment of the invention.

The fourth embodiment of the invention illustrated in FIG. 7 differs from the third embodiment illustrated in FIG. 6 in that the first shoulder 701 of the first radial holding means 70 is radially disposed between the first complementary shoulder 702 of the first radial holding means 70 and the outer support shroud 9, and in that the second shoulder 751 of the second radial holding means 75 is radially disposed between the second complementary shoulder 752 of the second radial holding means 75 and the inner support shroud 5, the first radial holding means 70 is radially disposed between the second radial holding means 75 and the outer support shroud 9.

The mast 6 allows to provide a means for securing the CMC distributor sector 20 from the top, that is to say to the casing, while minimizing the bending moment, insofar as the bending length is reduced by about half way through the mast 6 passing through the distributor sector. Each distributor sector 20 of the distributor is thus held in a deterministic manner, that is to say in such a way as to prevent the distributor sector 20 from starting to vibrate and by controlling its position, while allowing the distributor sector 20 to deform under the effects of temperature and pressure, among others independently of the metal parts at the interface.

The turbomachine turbine according to the invention comprises a turbine distributor at least partly made of CMC, the mounting of which is simplified and adapted to hold its distributor sectors in a deterministic manner while allowing the sectors to deform independently of the metal parts at the interface, by improving the sealing between the mast and the outer metal shroud, and by limiting, or even eliminating, the radial clearance opening in operation between the mast and the CMC blade, and thus controlling the radial positioning of the CMC blade using axial and tangential aerodynamic loads in flow path.

The invention claimed is:

1. A turbomachine turbine comprising a casing, an outer metal support shroud integral with the casing, an inner metal support shroud, and an annular turbine distributor defining an axial direction and a radial direction and including a plurality of annular distributor sectors made of ceramic matrix composite material forming a crown extending between the outer support shroud and the inner support shroud, each annular distributor sector including a metal mast, an inner platform, an outer platform and at least one blade extending radially between the inner and outer platforms and having a hollow profile that defines an inner housing extending radially, the inner and outer platforms each having an opening communicating with said inner housing of the blade, and the mast passing through said openings and the inner housing and being secured to said casing on the one hand and connected to said annular distributor sector on the other hand, wherein each blade comprises at least one first radial shoulder projecting in the axial direction from an inner surface of the blade towards the inside of the blade, and each mast comprises at least one second shoulder projecting in the axial direction from an outer surface of the mast towards the outside of the mast configured to cooperate with said at least one first shoulder in the radial direction and radially press the blade against the mast, at least one first shoulder comprising a first beveled portion forming a first non-zero angle with the axial direction and at least one second shoulder comprising a second beveled portion forming a second non-zero angle with the axial direction, the first angle and the second angle having the same value.

2. The turbine according to claim 1, wherein the first angle and the second angle are each comprised between 10° and 80°.

3. The turbine according to claim 1, wherein said at least one second shoulder is disposed in the radial direction between the first shoulder with which said at least one second shoulder cooperates to achieve the radial pressing and the outer support shroud.

4. The turbine according to claim 1, wherein said at least one second shoulder is disposed in the radial direction between the first shoulder with which said at least one second shoulder cooperates to achieve the radial pressing and the inner support shroud.

5. The turbine according to claim 1, comprising a third shoulder on the blade including a third beveled portion forming a third angle with the axial direction, as well as one fourth shoulder on the mast including a fourth beveled portion forming a fourth angle with the axial direction, the first and the second angles being of the same measure and the third and the fourth angles being of the same measure and different from the first and second angles.

6. The turbine according to claim 5, wherein the first and second shoulders and/or the third and fourth shoulders are intended to cooperate by shape complementarity.

7. The turbine according to claim 5, wherein the first shoulder is present in the vicinity of an outer radial end of the blade in the radial direction while the third shoulder is present in the vicinity of an inner radial end of the blade in the radial direction.

8. The turbine according to claim 1, wherein the mast is hollow.

9. A turbomachine comprising the turbine according to claim 1.

10. An aircraft comprising at least one turbomachine according to claim 9.

* * * * *